(12) United States Patent
Erhardt et al.

(10) Patent No.: US 11,248,621 B2
(45) Date of Patent: Feb. 15, 2022

(54) HYDRAULIC ROTARY FEED-THROUGH

(71) Applicant: IE ASSETS GMBH & CO. KG, Schorndorf (DE)

(72) Inventors: Steffen Erhardt, Winterbach (DE); Karl Haegele, Schorndorf (DE); Markus Lechler, Schorndorf (DE)

(73) Assignee: IE ASSETS GMBH + CO. KG, Schorndorf (DE)

( * ) Notice: Subject to any disclaimer, the term of this patent is extended or adjusted under 35 U.S.C. 154(b) by 222 days.

(21) Appl. No.: 16/567,677

(22) Filed: Sep. 11, 2019

(65) Prior Publication Data

US 2020/0040905 A1    Feb. 6, 2020

Related U.S. Application Data

(63) Continuation-in-part of application No. PCT/DE2018/100227, filed on Mar. 14, 2018.

(30) Foreign Application Priority Data

Mar. 17, 2017 (DE) .................... 10 2017 105 776.5
Jul. 13, 2017 (DE) .................... 20 2017 104 188.3

(51) Int. Cl.
| | |
|---|---|
| F04D 29/36 | (2006.01) |
| B64C 11/38 | (2006.01) |
| F15B 15/14 | (2006.01) |
| F16L 27/08 | (2006.01) |
| B63H 3/00 | (2006.01) |

(52) U.S. Cl.
CPC ........ *F04D 29/362* (2013.01); *F16L 27/0828* (2013.01); *B63H 3/00* (2013.01); *B64C 11/38* (2013.01); *F15B 15/149* (2013.01); *F15B 15/1452* (2013.01)

(58) Field of Classification Search
CPC ...... F03D 29/362; F16L 27/0828; B63H 3/00; B64C 11/38; F15B 15/1452; F15B 15/149
See application file for complete search history.

(56) References Cited

U.S. PATENT DOCUMENTS

| | | | |
|---|---|---|---|
| 4,899,641 | A | 2/1990 | Khan |
| 2016/0153479 | A1 | 6/2016 | Hägele |

FOREIGN PATENT DOCUMENTS

| | | | |
|---|---|---|---|
| DE | 199 03 565 A1 | | 8/2000 |
| DE | 10 2004 031 350 A1 | | 2/2006 |
| DE | 10 2006 025 494 A1 | | 12/2007 |
| DE | 10 2013 014 033 A1 | | 2/2015 |
| DE | 10 2013 014 033 B4 | | 12/2015 |

OTHER PUBLICATIONS

English translation of the International Search Report for the corresponding international application No. PCT/DE2018/100227 dated May 16, 2018 (2 pages).

*Primary Examiner* — Michael Leslie
*Assistant Examiner* — Daniel S Collins
(74) *Attorney, Agent, or Firm* — Ronald S. Lombard

(57) ABSTRACT

A hydraulic rotary feed-through with a neck which is accommodated in a housing via a bearing arrangement and through a pressurized fluid line extends to a pressure space with a seal arrangement provided axially between the pressure space and the bearing arrangement, the bearing arrangement and the seal arrangement are disposed in frames which are accommodated in the housing axially engaged with one another under pressure.

13 Claims, 4 Drawing Sheets

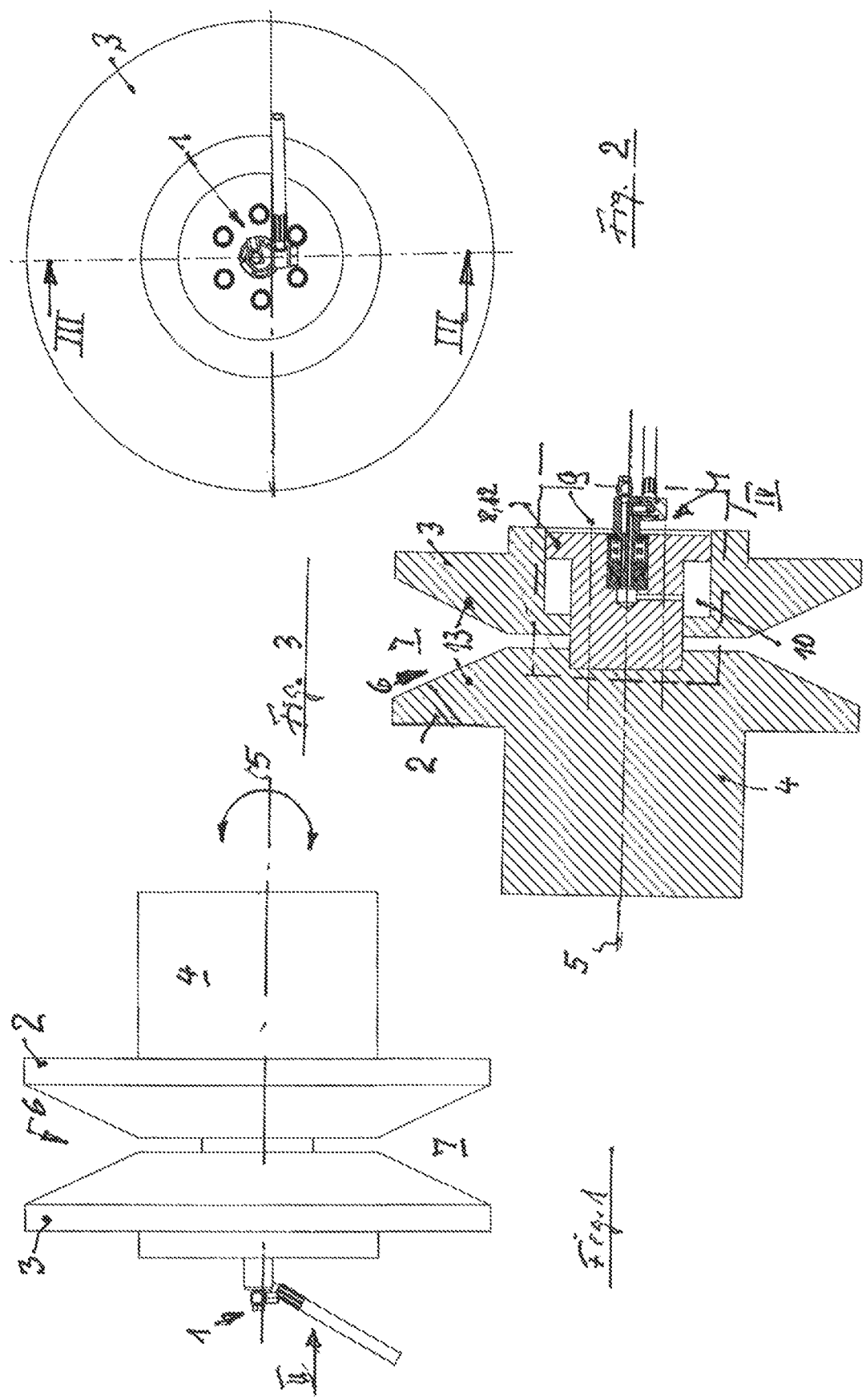

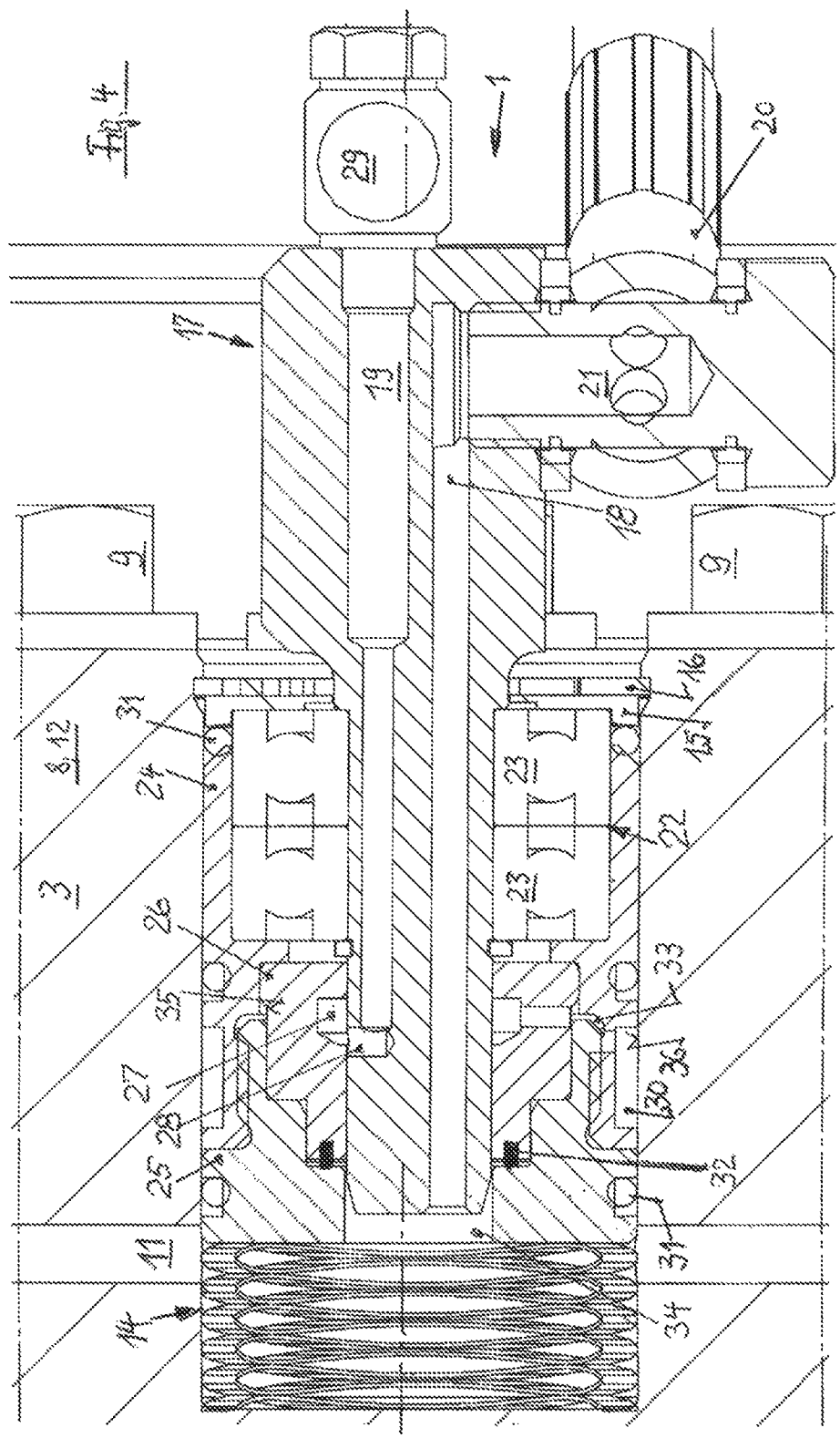

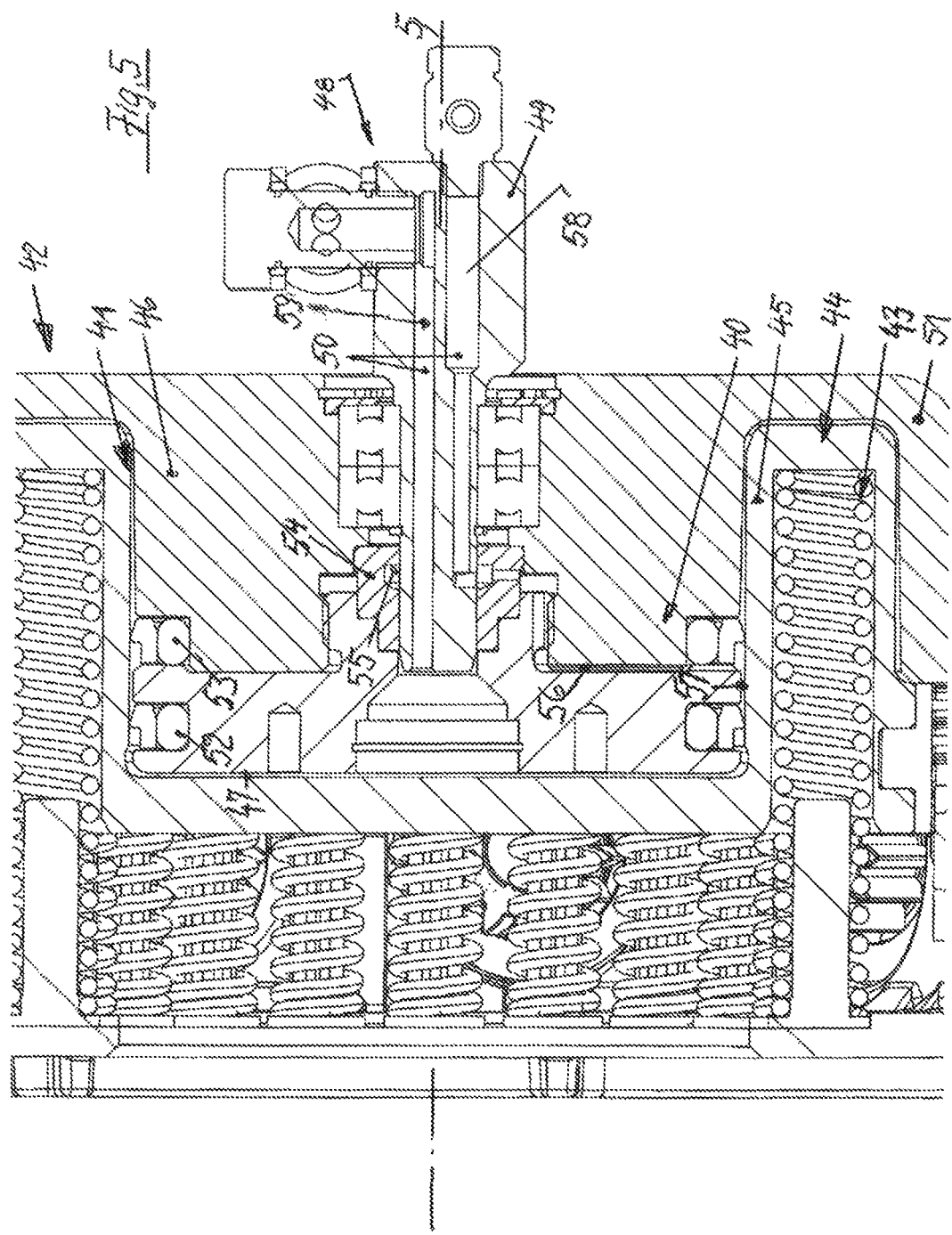

HYDRAULIC ROTARY FEED-THROUGH

CROSS-REFERENCE TO RELATED APPLICATIONS

This is a continuation-in-part application of pending international application PCT/DE2018/100227 filed Mar. 14, 2018 and claiming the priority of German Patent Application 10 2017 105 776.5 filed Mar. 17, 2017 and German Utility Model Application 20 2017 104 188.3 filed Jul. 13, 2017. The said international patent application PCT/DE2018/100227 and the said German Patent Application 10 2017 105 776.5 and the said German Utility Model Application 20 2017 104 188.3 are all incorporated herein by reference in their entireties as though fully set forth.

BACKGROUND OF THE INVENTION

The present invention resides in a hydraulic rotary feed-through with a central axis of rotation.

As shown in DE 10 2013 014 033 B4 hydraulic rotary feed-throughs are used for example in ventilator wheels which have a hub that is rotatably supported and provided with ventilator blades extending radially from the hub. The ventilator blades are rotatably supported on the hub so that their angle of attack is adjustable by a pressurized fluid admitted to the hub via the hydraulic rotary feed-through not only for changing the delivery quantity of the ventilator but, by pivoting the ventilator blades beyond the plane of rotation of the ventilator wheel, changing also the delivery direction without changing the direction of rotation of the ventilator wheel.

Such ventilator wheels are often quite large, depending on the desired ventilator performance and, accordingly, have relatively large seal areas which are subjected to correspondingly large leakage possibilities which are to be limited by appropriate design measures.

DE 199 03 565 A1 discloses a hydraulic rotary feed-through which, with respect to the required functions, is to have a minimized construction volume. Also the number and length of critical seal areas is to be reduced by an arrangement of the pressurized fluid supply line and the collection line in the rotation neck as a quasi common supply channel of the rotary feed-through. Such a rotary feed-through may also be used advantageously in connection with a V-belt drive whose belt discs are axially adjustable in relation to each other for changing the transmission ratio.

SUMMARY OF THE INVENTION

A hydraulic rotary feed-through with a neck which is accommodated in a housing via a bearing arrangement and through which a pressurized fluid line extends to a pressure space with a seal arrangement provided axially between the pressure space and the bearing arrangement, the bearing arrangement and the seal arrangement are disposed in frames which are accommodated in the housing axially engaged with one another under pressure.

With the design of the pressure and collection lines within the rotation neck where, in accordance with the invention, the bearing arrangement and the seal arrangement around the rotation neck are accommodated in axially abutting frames the small hydraulic feed-throughs and seal arrangements are relatively small so that they can be easily accommodated in a hub housing.

The combination of bearing arrangement and seal arrangement to a single assembly unit with mutual support and a common support structure in the housing in which they are disposed makes it additionally possible to use the rotation neck or rotational shaft also in connection with any accessory or operating device to which a pressurized medium can be supplied via the rotary feed-through.

The invention can be used particularly advantageously in connection with ventilator wheels in which the ventilator blade angles need to be adjusted by pressurized fluid against the air flow force, that is, hydraulically, that is by a pressurized fluid.

In practice the rotary feed-through may be supportively connectable to the housing via the surrounding bearing and/or seals so as to be rotatable and sealed with respect to the housing. The rotary feed-through with the accommodating housing may also form the counter part of a piston unit which delimits an operating chamber to which operating fluid is to be supplied via the rotary feed-through. However, the rotary feed-through may also be in the form of a separate device such as a cartridge which can be inserted into a housing opening depending on a particular purpose.

This embodiment of the invention permits the provision of small diameter structures in the center of a rotational neck in the area of the surrounding bearing(s) with about one third of the bearing diameter—with regard to a circular cross-section of the rotary feed-through in the form of an insertion cartridge.

The invention will become more readily apparent from the following description of particular embodiments and features thereof with reference to the accompanying drawings.

BRIEF DESCRIPTION OF THE DRAWINGS

FIG. 1 shows in a side view, a V-belt drive.

FIG. 2 shows the V-belt drive in an axial view in the direction as indicated in FIG. 1 by the arrow II.

FIG. 3 shows the V-belt drive pulley of FIG. 1 in a cross-sectional view taken along line III-III of FIG. 2.

FIG. 4 is a cross-sectional view of an enlarged section IV of FIG. 3 showing the hydraulic rotary feed-through accommodated in the drive disc of the V-belt pulley.

FIG. 5 shows, in a cross sectional view, a rotary feed-through as an insert in the hub of a ventilator with ventilator wheel vanes whose angle of attack is adjustable by a hydraulic control arrangement to which hydraulic control fluid is supplied via the rotary feed-through disposed in the ventilator wheel hub.

DETAILED DESCRIPTION OF THE INVENTION

Figure 6:
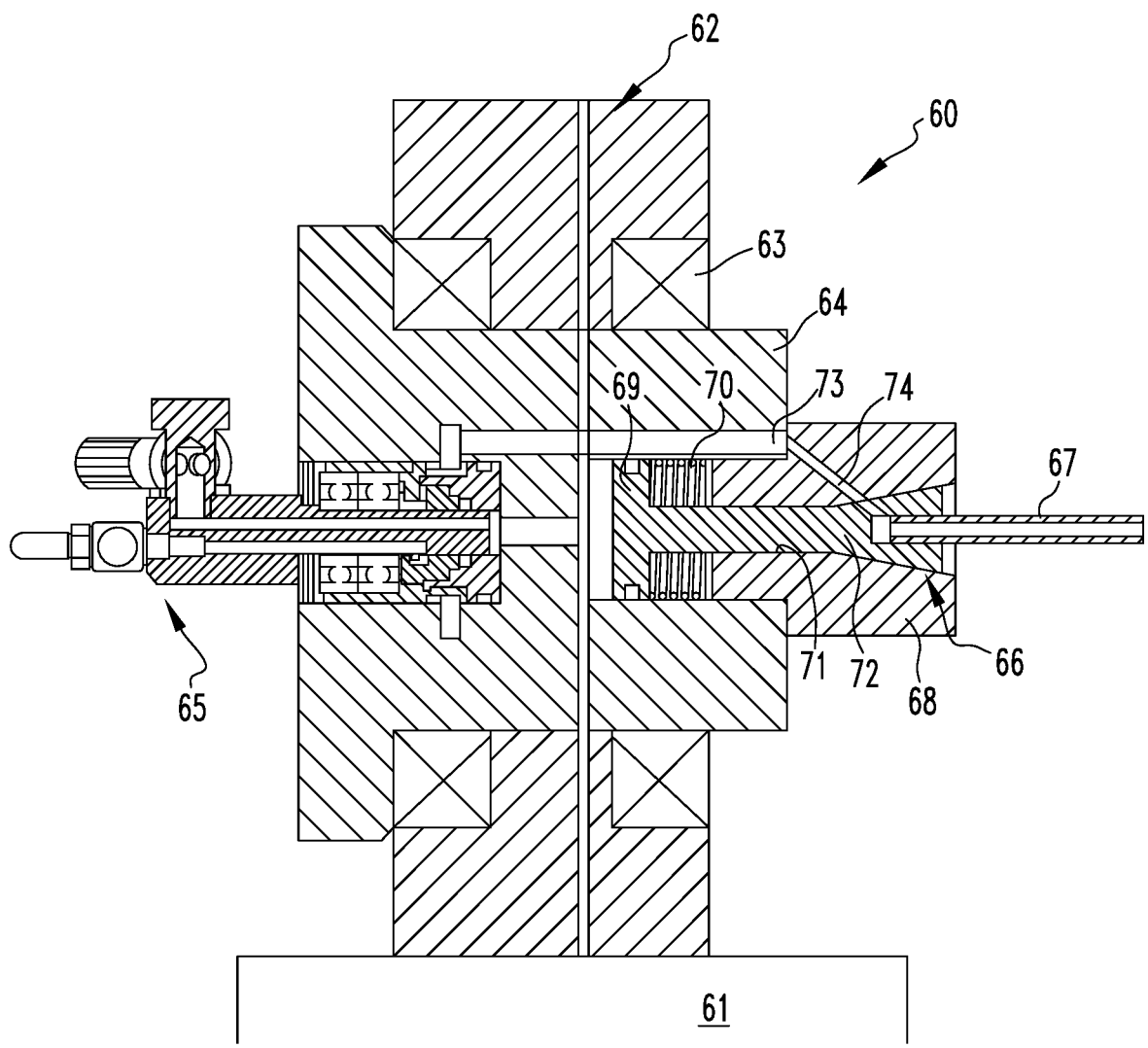
FIG. 6 is a further schematic representation of an operating unit with a hydraulically actuated operating element in the form of a chuck for a tool or for engaging a workpiece with a feed-through for supplying hydraulic operating fluid to the operating element.

For a good understanding of the function and the design of hydraulic rotational penetrations such a hydraulic rotary feed-through 1 according to the invention is first described as a component of a fluidically, in particular hydraulically, adjustable V-belt pulley 6.

The shown V-belt pulley 6 in the form of a drive unit includes a drive disc 2 which is connected to a drive shaft 4, for example a motor shaft, and a disc 3 which is axially movably supported for rotation with the shaft 4, but spaced from the drive disc 2 so as to define therebetween a wedge gap 7. The drive disc 2 and the opposite disc 3 form a wedge disc pair 13 in the wedge gap 7 of which a V-belt is accommodated which, however, is not shown in the figures. Via the V-belt, a drive connection is established between the wedge disc pair 13 and a corresponding wedge disc pair which drive connection has a variable transmission ratio by an adjustment of the spacing between the drive discs 2 and 3 and the corresponding change of support radius of the V-belt on the plate-like wedge discs 2, 3 while the tension of the V-belt is maintained.

As shown in FIG. 3 the drive discs 2 and 3 are arranged co-axially and interconnected for common rotation via a central guide member 8 on which the disc 3 is axially slidably supported so as to be rotatable therewith. The guide member 8 by which the disc 3 is axially guided and supported for rotation therewith extends centrally into the drive disc 2 and is fixed thereto by axial clamping elements 9, particularly, tightening screws. The clamping elements 9 extend through the guide member 8 parallel to the axis of rotation 5 and are fixed in the drive disc 2 to the drive shaft 4. The axially adjustable disc 3 which delimits an annular space 10 is supported on the guide member 8 for rotation therewith. The annular space 10 is connected via communication passages 11 (see FIG. 4) to the rotary feed-through 1 and is hydraulically pressurized for adjusting the axial position of the disc 3 relative to the drive disc 2 according to a desired transmission ratio.

The rotary feed-through 1 is arranged centrally that is co-axially with the guide member 8, which forms also a housing 12 for the rotary feed-through and delimits the accommodation space 34 for the rotary feed-through 1. In the accommodation space 34 the rotary feed-through 1 is arranged axially engaged and circumferentially sealed (seals 31). The axial engagement can be provided for example by means of a packet 14 of disc springs which is arranged at the inner end of the accommodation space 34. At the axially opposite end the accommodation space 34 is closed by a disc-like cover 15 which is preferably in the form of a divided disc held by a clamping ring 16 in the housing 12 which is part of the guide number 8.

The rotary feed-through 1, which is disposed in the accommodation space 34 of the housing 12, includes a rotatable neck 17 which is axially fixed in the housing 12 and in which a pressurized fluid line 18 and a fluid collection and/or leakage return line extends. Both extend radially spaced from the axis of rotation 5 but parallel thereto. The pressurized fluid is supplied to the pressurized fluid line 18 by a pressurized fluid connection 20 which is in the form of a rotatable connection and which is connected via a transverse bore 21 to the pressurized fluid line 18. The pressurized fluid line 18 is, at its axial end opposite the pressurized fluid connection 20, in communication with the annular space 10 via the line connection 11.

The rotary feed-through 1 is supported and retained in the accommodation space 34 with the rotatable neck 17 disposed axially adjacent the clamping plane of the clamping element 9 toward the top side of the guide member 8 via a bearing arrangement 22 which includes two bearings 23 that are supported in a mounting frame 24 axially adjacent to each other. The mounting frame 24 of the bearing arrangement 22 is axially engaged with a mounting frame 25 of a seal arrangement 26 surrounding the rotatable neck 17. In this seal arrangement 26 a leakage collection chamber 27 is provided in the rotatable neck 17 in the coverage area to an overflow area 28 to the collection-or leakage line 19. The collection/leakage line 19 extends from the overflow area 28 to a connection 29 for the return of possible leakage or, preferably, to an arrangement of leakage-detecting sensors, possibly including an optical indication for example in the form of a sight glass.

The optical feature is particularly user friendly, reliable and practical and facilitate the detection of leakage deviations from the normal operation, especially with a connection to the sight glass via a trunk-like flexible and preferably transparent duct. In particular such a trunk-like duct, that is a leakage trunk permits the sight glass to assume various positions. In connection with a larger duct length, it may be suitable to provide for the sight glass slight vacuum ventilation which does not affect the seals.

The mounting frames 24 and 25, which together delimit an annular space 35 for accommodating the seal arrangement 26 toward the rotatable neck 17, form in their overlapping area, when they are engaged with one another, limits for a collection pocket 30 which is radially open toward the wall 36 of the accommodation space 34. The collection pocket 30 is in communication with the leakage collection chamber 27 via a connecting passage 33 so that leakages from the seals 31 which extend around the mounting frames 24 and 25 are also collected and directed toward the collection and leakage line 19.

With the arrangement and the use of the rotary feed-through according to the invention, the seal gap between the parts which are movable relative to one another can be reduced to such an extent that leakages via the gaps in the area of the rotary feed-through 1 and the guide member 8 which might be subject to leakage are meaningless that is without noticeable or visible effects.

The seal arrangement 26 further includes an annular seal 32 which is disposed in the radial gap between the rotatable neck 17 and the mounting frame 25 accommodating the seal arrangement 26. The annular seal 32 prevents a short circuit connection between the discharge area of the pressurized fluid line 18 and the overflow area 28, which is axially spaced from the pressurized fluid line 18 to the collection and leakage line 19.

The use of a rotary feed-through 48 in an operating unit with operating elements which are adjustable relative to one another is described in connection with FIG. 5 concerning designs of ventilator wheels marketed under designation CLEANFIX® which ventilator wheels have been mentioned already in the introductory part. Characteristics of such designs are a central hub 42, operating elements in the form of air blades which extend radially from the hub 42 and whose angle of attack is adjustable but which are not shown in FIG. 5. A hydraulic adjustment arrangement 40 for the air blades is disposed in the hub 42. This adjustment arrangement 40 requires a rotary feed-through 48 so that the air blades are rotatable relative to the rotatable hub 42.

The adjustment arrangement 40 comprises a control piston 44 which is axially movably in a central cylinder chamber 41 of the hub 42 against the force of springs 43. The control piston 44 is pot shaped and has a cylindrical wall 45 which axially extends over a dome 46 and delimits an operating chamber 47 at the bottom of the dome 46. Hydraulic fluid can be supplied to the operating chamber 47 for an adjustment of the angular position of the ventilator blades extending radially from the hub 42.

As already described in connection with the exemplary embodiment shown in FIG. 4, to which reference is made because of details shown therein and also described in connection therewith, the rotary feed-through 48 includes a non-rotatably supported neck 49 through which fluid-conducting lines 50 extend in the form of a pressurized fluid supply line 59 and a fluid collection or leakage line 58. As a result, there are various areas to be sealed with respect to one another. To this end, there is, at one hand, an axial seal provided between the dome 46 and the cylindrical wall 45 of the control piston 44 and, on the other hand, between the non-rotatably supported neck 49 and the housing 51 through which the non-rotatable neck 49 extends and which is rotatable relative to the neck 49.

In accordance with the explanations concerning FIG. 4, these sealing boundaries are formed by the axially engaged seals 52, 53 disposed between the dome 46 and the annular cylindrical wall 45 of the control piston 44 and by the seal 54 between the dome 46 and the neck 45 of the rotary feed-through 48 which neck 45 is rotatable relative to the dome 46. The seal 54 which extends around the neck 49 delimits with the neck 49—like in FIG. 4—a leakage collection space 55 which is in communication via at least one drain passage 56 with a transfer chamber 57 formed between the seals 52 and 53. In this way, leakages collected from the seals 52, 53 and from the annular seal 54 of the neck 49 are supplied to a leakage collection line 58 and are drained thereby. The design shape of the dome 46 with a separating plane between the seals 52 and 53 so as to comprise axially adjacent sections is advantageous with regard to the seal arrangements and the configuration of the connecting passages to the leakage collecting space 55.

Overall, FIG. 5 shows an advantageous further development of the known CLEANFIX® ventilator wheels concerning an essentially leakage-free design of operating units. Such operating units include, in addition to the ventilator wheels and V-belt drives mentioned earlier, also for example machine tools wherein coolant and/or lubricants need to be supplied to shaft end clamping arrangements for example.

FIG. 6 shows the use of a rotary feed-through according to the invention with design features essentially as shown in FIG. 4 in connection with a turning lathe 60 as an example for its use in connection with stationary machines, in particular machine tools. However its use in connection with hand tools is also possible.

Concerning the use in a turning lathe 60, that is a stationary machine tool, FIG. 6 shows the headstock 62, in which the rotatable spindle 64 is supported by a bearing 63 disposed on a turning lathe base 61 and fixed thereto. In one end of the spindle 64 a rotary feed-through 65 of the type as shown in FIG. 4 is co-axially accommodated so as to be rotationally fixed to headstock 62 in a way not shown in the drawings. At the axially opposite end of the spindle 64 a chuck 66 for a workpiece 67, a tool or another clamping or machining device, to which hydraulic fluid is to be supplied, is provided.

The end of the spindle 64 axially opposite the rotary feed-through 65 may form a guide housing 68 accommodating a clamping piston 69 for such a chuck 66. This clamping piston 69 is axially movable against the force of the spring 70 by hydraulic fluid which is supplied via the rotary feed-through 65. The clamping function is indicated in FIG. 6 in that the guide base 71 for the shaft 72 is coaxially widened toward its free end so that, with an oppositely conical shape of the receiving cross-section of the chuck 66 for the engagement of a tool or a workpiece 67 is compressed when the clamping piston is moved with the shaft 72 is moved with the shaft 72 inwardly by the spring 70. The axially movable chuck 66 for a tool or workpiece 67 at the end of the shaft 72 may be divided in the conical end area into an annular array of radially elastic clamping fingers.

It is furthermore shown in FIG. 6 that also coolant and lubricant can be supplied to the tool or workpiece 67 via the rotary feed-through 65. This can be achieved in a simple manner by a branch line from the pressure channel of the rotary feed-through 65 via supply lines 73 and 74 in the spindle 64 and in the chuck 66 which supply lines extend to the tool or workpiece 67.

For the use of the rotary feed-through 65 in connection with handheld machine tools, based on the representation of FIG. 6, the spindle 64 is accommodated via a bearing 63 in a housing in the form of a handle instead of being mounted on headstock 62 supported on a turning lathe base 61. Suitably, also the drive motor for the spindle 64 is accommodated in the housing forming the handle. For ease of handling the housing should be relatively slim.

LIST OF REFERENCE NUMBERS 1 rotary feed-through
2 drive disc
3 drive disc
4 drive shaft
5 axis of rotation
6 V-belt drive
7 wedge gap
8 guide member
9 clamping element
10 annular space
11 line connection
12 housing
13 wedge disc pair
14 packet of disc springs
15 disc-like cover
16 clamping ring
17 rotatable neck
18 pressurized fluid line
19 collection and leakage line
20 pressurized fluid connection
21 transverse base
22 bearing component
23 bearing
24 mounting frame
25 mounting frame
26 seal arrangement
27 leakage collection chamber
28 overflow area
29 connection
30 collection pocket
31 seals
32 annular seal
33 connecting passage
34 accommodation space
35 annular space
36 wall
40 adjustment arrangement
41 cylinder chamber
42 hub
43 springs
44 control piston
45 cylindrical wall
46 dome
47 operating chamber
48 rotary feed-through
49 rotatable neck
50 supply line
51 housing
52 seal
53 seal
54 seal 55 leakage collection space
56 drain passage
57 transfer chamber
58 leakage collection line
59 pressure line
60 turning lathe
61 turning lathe base
62 headstock
63 bearing
64 spindle
65 rotary feed-through
66 chuck
67 workpiece
68 guide housing
69 clamping piston
70 spring
71 guide base
72 shaft
73 supply line
74 supply line

What is claimed is:

1. A hydraulic rotary feed-through (1,48), with a central axis of rotation (5) including:
a neck (17,49) rotatably supported centrally in a housing (12,51) via a bearing arrangement (22) with a pressurized fluid line (18,60) extending through the neck (17,49) from a pressurized fluid connection (20) at a front end of the housing (12,51) to a pressure space (34) at the opposite end of the rotary feedthrough (1,48) a seal arrangement (26,54) provided axially between the pressure space (34) of the rotary feed-through (1,48) and the bearing arrangement (22) and surrounding the rotatable neck (17,49), the seal arrangement (26,54) delimiting a leakage collection chamber (27,55) with respect to the rotatably supported neck (17,49), and the rotatably supported neck (17,49) further including a collection line (19, 58) extending from the leakage collection chamber (27,59) to the front end of the housing (12,51) in parallel spaced relationship with the pressurized fluid line (18,60),
wherein the bearing arrangement (22) and the seal arrangement (26) are accommodated in frames (24,25) which are axially supported against one another, and,
wherein the frames (24,25) are arranged in the housing (12) of the rotary feed-through (1) with circumferential seals (31).

2. The hydraulic rotary feed-through according to claim 1, wherein the frames (24,25) are interconnected axially overlapping so as to form a unit.

3. A hydraulic rotary feed-through (1,48), with a central axis of rotation (5) including:
a neck (17,49) rotatably supported centrally in a housing (12,51) via a bearing arrangement (22) with a pressurized fluid line (18,60) extending through the neck (17,49) from a pressurized fluid connection (20) at a front end of the housing (12,51) to a pressure space (34) at the opposite end of the rotary feedthrough (1,48) a seal arrangement (26,54) provided axially between the pressure space (34) of the rotary feed-through (1,48) and the bearing arrangement (22) and surrounding the rotatable neck (17,49), the seal arrangement (26,54) delimiting a leakage collection chamber (27,55) with respect to the rotatably supported neck (17,49), and the rotatably supported neck (17,49) further including a collection line (19, 58) extending from the leakage collection chamber (27,59) to the front end of the housing (12,51) in parallel spaced relationship with the pressurized fluid line (18,60),
wherein the bearing arrangement (22) and the seal arrangement (26) are accommodated in frames (24,25) which are axially supported against one another, and,
wherein the rotary feed-through (1) is in the form of an insertion cartridge.

4. A hydraulic rotary feed-through (1,48), with a central axis of rotation (5) including:
a neck (17,49) rotatably supported centrally in a housing (12,51) via a bearing arrangement (22) with a pressurized fluid line (18,60) extending through the neck (17,49) from a pressurized fluid connection (20) at a front end of the housing (12,51) to a pressure space (34) at the opposite end of the rotary feedthrough (1,48) a seal arrangement (26,54) provided axially between the pressure space (34) of the rotary feed-through (1,48) and the bearing arrangement (22) and surrounding the rotatable neck (17,49), the seal arrangement (26,54) delimiting a leakage collection chamber (27,55) with respect to the rotatably supported neck (17,49), and the rotatably supported neck (17,49) further including a collection line (19, 58) extending from the leakage collection chamber (27,59) to the front end of the housing (12,51) in parallel spaced relationship with the pressurized fluid line (18,60),
wherein the bearing arrangement (22) and the seal arrangement (26) are accommodated in frames (24,25) which are axially supported against one another, and,
wherein the seal arrangement (26) is axially pressed against the bearing arrangement (22) by a disc spring packet (14) disposed at the pressure end of the rotary feed-through (1).

5. A hydraulic rotary feed-through (1,48), with a central axis of rotation (5) including:
a neck (17,49) rotatably supported centrally in a housing (12,51) via a bearing arrangement (22) with a pressurized fluid line (18,60) extending through the neck (17,49) from a pressurized fluid connection (20) at a front end of the housing (12,51) to a pressure space (34) at the opposite end of the rotary feedthrough (1,48) a seal arrangement (26,54) provided axially between the pressure space (34) of the rotary feed-through (1,48) and the bearing arrangement (22) and surrounding the rotatable neck (17,49), the seal arrangement (26,54) delimiting a leakage collection chamber (27,55) with respect to the rotatably supported neck (17,49), and the rotatably supported neck (17,49) further including a collection line (19, 58) extending from the leakage collection chamber (27,59) to the front end of the housing (12,51) in parallel spaced relationship with the pressurized fluid line (18,60),
wherein the bearing arrangement (22) and the seal arrangement (26) are accommodated in frames (24,25) which are axially supported against one another,
wherein the rotary feed-through (1) is part of an operating unit with operating elements which are adjustable relative to one another, and,
wherein as operating unit a V-belt drive (6) is provided whose hydraulically adjustable operating elements are V-belt discs (2,3) and one of the axially hydraulically adjustable V-belt discs (2,3) is formed by the housing (12) of the rotary feedthrough (1).

6. A hydraulic rotary feed-through (1,48), with a central axis of rotation (5) including:
a neck (17,49) rotatably supported centrally in a housing (12,51) via a bearing arrangement (22) with a pressurized fluid line (18,60) extending through the neck (17,49) from a pressurized fluid connection (20) at a front end of the housing (12,51) to a pressure space (34) at the opposite end of the rotary feedthrough (1,48) a seal arrangement (26,54) provided axially between the pressure space (34) of the rotary feed-through (1,48) and the bearing arrangement (22) and surrounding the rotatable neck (17,49), the seal arrangement (26,54) delimiting a leakage collection chamber (27,55) with respect to the rotatably supported neck (17,49), and the rotatably supported neck (17,49) further including a collection line (19, 58) extending from the leakage collection chamber (27,59) to the front end of the housing (12,51) in parallel spaced relationship with the pressurized fluid line (18,60), wherein the bearing arrangement (22) and the seal arrangement (26) are accommodated in frames (24,25) which are axially supported against one another, wherein the rotary feed-through (1) is part of an operating unit with operating elements which are adjustable relative to one another, and, wherein the operating unit is a ventilator with a central hub (42) and with a rotary feedthrough (1) accommodated centrally in the hub (42) and further with ventilator blades extending radially from the hub (42) with an adjustable angle of attack, wherein on relatively adjustable operating elements the hub housing (51) accommodates an hydraulically activated operating piston (44) which is operatively connected to the ventilator blades for adjusting their angle of attack.

7. The hydraulic rotary feed-through according to claim 6, wherein the hub housing (51) is pot-shaped for accommodating the operating piston (44), which is sealed relative to the neck (49) and the cylindrical wall (45) of the piston by seal arrangements (52).

8. A hydraulic rotary feed-through (1,48), with a central axis of rotation (5) including:

a neck (17,49) rotatably supported centrally in a housing (12,51) via a bearing arrangement (22) with a pressurized fluid line (18,60) extending through the neck (17,49) from a pressurized fluid connection (20) at a front end of the housing (12,51) to a pressure space (34) at the opposite end of the rotary feedthrough (1,48) a seal arrangement (26,54) provided axially between the pressure space (34) of the rotary feed-through (1,48) and the bearing arrangement (22) and surrounding the rotatable neck (17,49), the seal arrangement (26,54) delimiting a leakage collection chamber (27,55) with respect to the rotatably supported neck (17,49), and the rotatably supported neck (17,49) further including a collection line (19, 58) extending from the leakage collection chamber (27,59) to the front end of the housing (12,51) in parallel spaced relationship with the pressurized fluid line (18,60), wherein the bearing arrangement (22) and the seal arrangement (26) are accommodated in frames (24,25) which are axially supported against one another, wherein the rotary feed-through (1) is part of an operating unit with operating elements which are adjustable relative to one another, and, wherein the rotary feed-through (1) is provided in connection with a driven rotatable operating element, in particular a rotating operating tool.

9. The hydraulic rotary feed-through according to claim 3, wherein the frames (24,25) are interconnected axially overlapping so as to form a unit.

10. The hydraulic rotary feed-through according to claim 4, wherein the frames (24,25) are interconnected axially overlapping so as to form a unit.

11. The hydraulic rotary feed-through according to claim 5, wherein the frames (24,25) are interconnected axially overlapping so as to form a unit.

12. The hydraulic rotary feed-through according to claim 6, wherein the frames (24,25) are interconnected axially overlapping so as to form a unit.

13. The hydraulic rotary feed-through according to claim 8, wherein the frames (24,25) are interconnected axially overlapping so as to form a unit.

\* \* \* \* \*